US009600071B2

(12) United States Patent
Rothkopf (10) Patent No.: US 9,600,071 B2
(45) Date of Patent: Mar. 21, 2017

(54) LINEAR VIBRATOR PROVIDING LOCALIZED HAPTIC FEEDBACK

(75) Inventor: Fletcher Rothkopf, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 468 days.

(21) Appl. No.: 13/411,110

(22) Filed: Mar. 2, 2012

(65) Prior Publication Data
US 2012/0223824 A1    Sep. 6, 2012

Related U.S. Application Data

(60) Provisional application No. 61/449,598, filed on Mar. 4, 2011.

(51) Int. Cl.
*H04B 3/36* (2006.01)
*G06F 3/01* (2006.01)

(52) U.S. Cl.
CPC .................. *G06F 3/016* (2013.01)

(58) Field of Classification Search
USPC .. 340/4.2, 5.72, 7.6, 7.61, 7.62, 7.63, 407.1, 340/407.2; 345/156, 160, 163, 173, 184
See application file for complete search history.

(56) References Cited

U.S. PATENT DOCUMENTS

| 5,293,161 | A |   | 3/1994 | MacDonald et al. |
|---|---|---|---|---|
| 5,434,549 | A | * | 7/1995 | Hirabayashi et al. ........ 335/229 |
| 5,436,622 | A | * | 7/1995 | Gutman .................. G08B 6/00 340/407.1 |
| 5,739,759 | A | * | 4/1998 | Nakazawa et al. .......... 340/7.62 |
| 6,342,880 | B2 |   | 1/2002 | Rosenberg et al. |
| 6,373,465 | B2 |   | 4/2002 | Jolly et al. |
| 6,438,393 | B1 |   | 8/2002 | Suuronen |
| 6,493,612 | B1 |   | 12/2002 | Bisset et al. |

(Continued)

FOREIGN PATENT DOCUMENTS

| CN | 101036105 | 9/2007 |
|---|---|---|
| CN | 101409164 | 4/2009 |

(Continued)

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

(Continued)

*Primary Examiner* — Travis Hunnings
(74) *Attorney, Agent, or Firm* — Brownstein Hyatt Farber Schreck, LLP (57) ABSTRACT

An apparatus for providing haptic feedback, including: a shell defining an aperture; a driver disposed within the shell; a mass disposed within the coil; and a projection connected to the mass and extending through the aperture. Also described herein is a method for providing generalized and localized haptic feedback, including the operations of: receiving an input signal; determining if the input signal corresponds to a generalized haptic feedback; if so, providing a first input to a linear vibrator; otherwise, providing a second input to a linear vibrator; wherein the linear vibrator outputs a generalized haptic feedback in response to the first input; and the linear vibrator outputs a localized haptic feedback in response to the second input.

10 Claims, 5 Drawing Sheets

(56) References Cited

U.S. PATENT DOCUMENTS

| | | | |
|---|---|---|---|
| 6,693,622 B1 | 2/2004 | Shahoian et al. | |
| 6,822,635 B2 | 11/2004 | Shahoian | |
| 6,864,877 B2 | 3/2005 | Braun et al. | |
| 6,952,203 B2 | 10/2005 | Banerjee et al. | |
| 6,988,414 B2 | 1/2006 | Ruhrig et al. | |
| 7,068,168 B2 | 6/2006 | Girshovich et al. | |
| 7,080,271 B2 | 7/2006 | Kardach et al. | |
| 7,130,664 B1 | 10/2006 | Williams | |
| 7,234,379 B2 | 6/2007 | Claesson et al. | |
| 7,253,350 B2 | 8/2007 | Noro et al. | |
| 7,323,959 B2 | 1/2008 | Naka et al. | |
| 7,370,289 B1 | 5/2008 | Ebert et al. | |
| 7,392,066 B2 | 6/2008 | Haparnas | |
| 7,423,631 B2 | 9/2008 | Shahoian et al. | |
| 7,508,382 B2 | 3/2009 | Denoue et al. | |
| 7,570,254 B2 | 8/2009 | Suzuki et al. | |
| 7,656,388 B2 | 2/2010 | Schena et al. | |
| 7,675,414 B2 | 3/2010 | Ray | |
| 7,710,399 B2 | 5/2010 | Bruneau et al. | |
| 7,741,938 B2 | 6/2010 | Kramlich | |
| 7,755,605 B2 | 7/2010 | Daniel et al. | |
| 7,798,982 B2 | 9/2010 | Zets et al. | |
| 7,825,903 B2* | 11/2010 | Anastas et al. | 345/173 |
| 7,855,657 B2 | 12/2010 | Doemens et al. | |
| 7,890,863 B2 | 2/2011 | Grant et al. | |
| 7,893,922 B2 | 2/2011 | Klinghult et al. | |
| 7,904,210 B2 | 3/2011 | Pfau et al. | |
| 7,919,945 B2 | 4/2011 | Houston et al. | |
| 7,952,261 B2 | 5/2011 | Lipton et al. | |
| 7,952,566 B2 | 5/2011 | Poupyrev et al. | |
| 7,956,770 B2 | 6/2011 | Klinghult et al. | |
| 7,976,230 B2 | 7/2011 | Ryynanen et al. | |
| 8,002,089 B2* | 8/2011 | Jasso et al. | 188/83 |
| 8,081,156 B2 | 12/2011 | Ruettiger | |
| 8,125,453 B2 | 2/2012 | Shahoian et al. | |
| 8,154,537 B2* | 4/2012 | Olien | 345/184 |
| 8,169,402 B2 | 5/2012 | Shahoian et al. | |
| 8,174,495 B2 | 5/2012 | Takashima et al. | |
| 8,217,892 B2 | 7/2012 | Meadors | |
| 8,232,494 B2 | 7/2012 | Purcocks | |
| 8,248,386 B2 | 8/2012 | Harrison | |
| 8,262,480 B2 | 9/2012 | Cohen et al. | |
| 8,265,308 B2 | 9/2012 | Gitzinger et al. | |
| 8,344,834 B2* | 1/2013 | Niiyama | 335/207 |
| 8,345,025 B2 | 1/2013 | Seibert et al. | |
| 8,351,104 B2 | 1/2013 | Zaifrani et al. | |
| 8,378,797 B2 | 2/2013 | Pance et al. | |
| 8,378,965 B2 | 2/2013 | Gregorio et al. | |
| 8,384,316 B2* | 2/2013 | Houston et al. | 318/114 |
| 8,390,218 B2* | 3/2013 | Houston et al. | 318/114 |
| 8,390,594 B2 | 3/2013 | Modarres et al. | |
| 8,469,806 B2 | 6/2013 | Grant et al. | |
| 8,493,189 B2 | 7/2013 | Suzuki | |
| 8,605,141 B2 | 12/2013 | Dialameh et al. | |
| 8,619,031 B2* | 12/2013 | Hayward | 345/160 |
| 8,633,916 B2 | 1/2014 | Bernstein et al. | |
| 8,639,485 B2* | 1/2014 | Connacher et al. | 703/11 |
| 8,681,130 B2 | 3/2014 | Adhikari | |
| 8,717,151 B2 | 5/2014 | Forutanpour et al. | |
| 8,760,037 B2 | 6/2014 | Eshed et al. | |
| 8,773,247 B2 | 7/2014 | Ullrich | |
| 8,872,448 B2 | 10/2014 | Boldyrev et al. | |
| 8,976,139 B2 | 3/2015 | Koga et al. | |
| 8,981,682 B2 | 3/2015 | Delson et al. | |
| 9,086,727 B2 | 7/2015 | Tidemand et al. | |
| 9,134,796 B2 | 9/2015 | Lemmons et al. | |
| 9,172,669 B2 | 10/2015 | Swink et al. | |
| 2002/0033795 A1* | 3/2002 | Shahoian | G06F 1/1616 345/156 |
| 2003/0117132 A1 | 6/2003 | Klinghult | |
| 2004/0183782 A1* | 9/2004 | Shahoian et al. | 345/163 |
| 2005/0036603 A1 | 2/2005 | Hughes | |
| 2005/0230594 A1* | 10/2005 | Sato et al. | 248/652 |
| 2006/0054427 A1* | 3/2006 | Jasso et al. | 188/72.1 |
| 2006/0209037 A1 | 9/2006 | Wang et al. | |
| 2006/0223547 A1 | 10/2006 | Chin et al. | |
| 2006/0252463 A1* | 11/2006 | Liao et al. | 455/567 |
| 2006/0256075 A1* | 11/2006 | Anastas et al. | 345/156 |
| 2007/0106457 A1 | 5/2007 | Rosenberg | |
| 2007/0152974 A1 | 7/2007 | Kim et al. | |
| 2008/0062144 A1* | 3/2008 | Shahoian | G06F 1/1616 345/173 |
| 2008/0062145 A1* | 3/2008 | Shahoian | G06F 1/1616 345/173 |
| 2008/0084384 A1* | 4/2008 | Gregorio et al. | 345/156 |
| 2008/0158149 A1* | 7/2008 | Levin | 345/156 |
| 2009/0046054 A1* | 2/2009 | Olien | 345/156 |
| 2009/0051509 A1* | 2/2009 | Hwang | 340/407.2 |
| 2009/0085879 A1* | 4/2009 | Dai et al. | 345/173 |
| 2009/0115734 A1 | 5/2009 | Fredriksson et al. | |
| 2009/0135164 A1* | 5/2009 | Kyung | G06F 3/03545 345/179 |
| 2009/0167542 A1 | 7/2009 | Culbert et al. | |
| 2009/0167702 A1 | 7/2009 | Nurmi | |
| 2009/0174672 A1* | 7/2009 | Schmidt | 345/173 |
| 2009/0225046 A1 | 9/2009 | Kim et al. | |
| 2009/0231271 A1 | 9/2009 | Heubel et al. | |
| 2009/0243404 A1 | 10/2009 | Kim et al. | |
| 2009/0267892 A1 | 10/2009 | Faubert | |
| 2009/0267920 A1 | 10/2009 | Faubert et al. | |
| 2009/0313542 A1 | 12/2009 | Cruz-Hernandez et al. | |
| 2010/0048256 A1 | 2/2010 | Huppi et al. | |
| 2010/0056953 A1 | 3/2010 | Couvillon | |
| 2010/0073304 A1* | 3/2010 | Grant et al. | 345/173 |
| 2010/0116629 A1 | 5/2010 | Borissov et al. | |
| 2010/0225600 A1 | 9/2010 | Dai et al. | |
| 2010/0267424 A1* | 10/2010 | Kim et al. | 455/566 |
| 2010/0328229 A1 | 12/2010 | Weber et al. | |
| 2011/0025609 A1* | 2/2011 | Modarres et al. | 345/173 |
| 2011/0050406 A1* | 3/2011 | Hennig et al. | 340/407.2 |
| 2011/0115754 A1 | 5/2011 | Cruz-Hernandez | |
| 2011/0128239 A1 | 6/2011 | Polyakov et al. | |
| 2011/0132114 A1* | 6/2011 | Siotis | 74/87 |
| 2011/0163946 A1 | 7/2011 | Tartz et al. | |
| 2011/0187498 A1* | 8/2011 | Flaherty et al. | 340/5.72 |
| 2011/0205038 A1* | 8/2011 | Drouin et al. | 340/407.2 |
| 2011/0210834 A1 | 9/2011 | Pasquero et al. | |
| 2011/0210926 A1 | 9/2011 | Pasquero et al. | |
| 2011/0248817 A1* | 10/2011 | Houston et al. | 340/4.2 |
| 2011/0254782 A1* | 10/2011 | Park | 345/173 |
| 2012/0062491 A1 | 3/2012 | Coni et al. | |
| 2012/0096351 A1 | 4/2012 | Shahoian et al. | |
| 2012/0127071 A1* | 5/2012 | Jitkoff et al. | 345/156 |
| 2012/0127088 A1 | 5/2012 | Pance et al. | |
| 2012/0235942 A1* | 9/2012 | Shahoian | G06F 1/1616 345/173 |
| 2012/0249315 A1* | 10/2012 | Vanhelle et al. | 340/425.5 |
| 2012/0286943 A1 | 11/2012 | Rothkopf et al. | |
| 2012/0319827 A1* | 12/2012 | Pance et al. | 340/407.1 |
| 2013/0002341 A1 | 1/2013 | Maier et al. | |
| 2013/0044049 A1 | 2/2013 | Biggs et al. | |
| 2013/0127755 A1 | 5/2013 | Lynn et al. | |
| 2013/0207793 A1 | 8/2013 | Weaber et al. | |
| 2013/0253818 A1 | 9/2013 | Sanders et al. | |
| 2013/0278401 A1* | 10/2013 | Flaherty et al. | 340/407.2 |
| 2014/0002386 A1 | 1/2014 | Rosenberg et al. | |
| 2014/0028573 A1 | 1/2014 | Olien et al. | |
| 2014/0125470 A1* | 5/2014 | Rosenberg | F41A 17/06 340/407.2 |
| 2014/0218183 A1 | 8/2014 | Van Schyndel et al. | |
| 2014/0218853 A1 | 8/2014 | Pance et al. | |
| 2014/0225831 A1 | 8/2014 | Shinozaki et al. | |
| 2014/0274398 A1 | 9/2014 | Grant | |
| 2014/0282270 A1 | 9/2014 | Slonneger | |
| 2015/0126070 A1 | 5/2015 | Candelore | |
| 2015/0277562 A1 | 10/2015 | Bard et al. | |
| 2015/0338919 A1 | 11/2015 | Weber et al. | |
| 2016/0011664 A1 | 1/2016 | Silvanto et al. | |

FOREIGN PATENT DOCUMENTS

| | | |
|---|---|---|
| CN | 101663104 | 3/2010 |
| CN | 101872257 | 10/2010 |

(56) References Cited

FOREIGN PATENT DOCUMENTS

| EP | 1686776 | 8/2006 |
|----|---------|--------|
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| TW | 2010035805 | 10/2010 |
| WO | WO02/073587 | 9/2002 |
| WO | WO2006/091494 | 8/2006 |
| WO | WO2007/114631 | 10/2007 |
| WO | WO2009/038862 | 3/2009 |
| WO | WO2014/066516 | 5/2014 |

OTHER PUBLICATIONS

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

International Search Report, PCT/US2012/027187, 6 pages, Jul. 17, 2012.

Taiwanese Search Report, TW101107208, 1 page, Dec. 17, 2013.

* cited by examiner

LINEAR VIBRATOR PROVIDING LOCALIZED HAPTIC FEEDBACK

CROSS-REFERENCE TO RELATED APPLICATIONS

This application claims the benefit under 35 U.S.C. §119 (e) to U.S. Provisional Patent Application No. 61/449,598, filed Mar. 4, 2011 and titled "Linear Vibrator Providing Localized Haptic Feedback," this disclosure of which is hereby incorporated herein in its entirety.

TECHNICAL FIELD

Embodiments described herein generally relate to vibration-producing devices, and more particularly to vibration-producing devices providing localized haptic feedback.

BACKGROUND

Many electronic devices use linear vibrators to provide generalized haptic feedback by shaking or vibrating the device enclosure. For example, many mobile telephones may be set to a vibrate mode, so that the phone body (e.g., enclosure) vibrates when a call is received in lieu of emitting an audible ring tone. However, linear vibrators typically vibrate the entire device and/or enclosure and thus provide generalized haptic feedback.

In certain embodiments, it may be useful or desirable to localize haptic feedback. For example, certain electronic devices may use virtual or touch-based keyboards, buttons, and other input mechanisms. Without some form of localized feedback, it may be difficult for a user to detect if the input mechanism was properly or adequately touched. A generalized haptic feedback, such as vibrating the entire electronic device, may be insufficiently precise.

SUMMARY

One embodiment described herein may take the form of an apparatus for providing haptic feedback, including: a shell defining an aperture; a driver disposed within the shell; a mass disposed within the coil; and a projection connected to the mass and extending through the aperture.

Another embodiment described herein may take the form of a method for providing generalized and localized haptic feedback, including the operations of: receiving an input signal; determining if the input signal corresponds to a generalized haptic feedback; if so, providing a first input to a linear vibrator; otherwise, providing a second input to a linear vibrator; wherein the linear vibrator outputs a generalized haptic feedback in response to the first input; and the linear vibrator outputs a localized haptic feedback in response to the second input.

DETAILED DESCRIPTION

One embodiment described herein may take the form of a linear vibrator capable of providing localized haptic feedback. The vibrator may include a mass and a driver operable to oscillate or otherwise move the mass. The driver and mass may be contained within a shell. A projection may extend from one end of the mass through the shell.

During normal operation, the driver may oscillate the mass rapidly along an axis of motion. The kinetic energy created by this oscillation may be transferred to the shell by a leaf spring or other coupling element coupling the mass and the shell. For example, any elastic element may couple the mass and shell. The shell, in turn, may be connected or affixed to a housing of an electronic device. In this manner, the housing may vibrate as the kinetic energy of the mass oscillation is transferred through the shell and to the housing, thereby providing generalized haptic feedback.

Further, the vibrator may be operated in a boosted mode to provide localized haptic feedback. In the boosted mode, the driver moves the mass reciprocally further along its axis of motion. The range of motion of the mass in the boosted mode is sufficient to cause the projection to impact a portion of the electronic device housing. The projection may transfer kinetic energy directly to the impacted portion of the housing. Since the projection is relatively small in relation to the size of the housing, this impact may create a vibration in a relatively small area of the housing. In certain embodiments, the vibration may be felt only in the impacted portion of the housing. In other embodiments, the vibration may be felt in some area around the impacted portion but generally not across the entirety of the housing. Thus, the embodiment may provide generalized haptic feedback when operating in a standard mode and localized haptic feedback when operating in a boosted mode.

Figure 1:
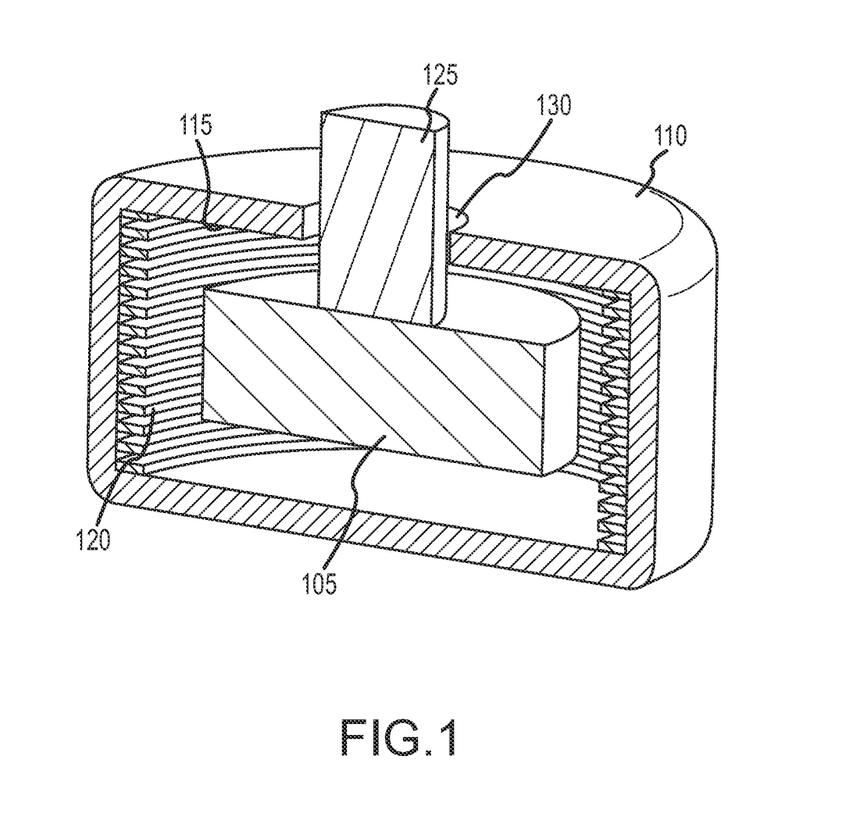
FIG. 1 is a cut-away perspective view of a simplified linear vibrator capable of providing haptic feedback.

FIG. 1 is a cut-away view of one sample embodiment of a linear vibrator 100, taken approximately through the center of the embodiment. It should be appreciated that the linear vibrator 100 shown in FIG. 1 is simplified for purposes of clarity. For example, an elastic member (such as a leaf spring) generally rests between the magnet 105 and shell 110; the elastic member is not shown in FIG. 1. Likewise, one or more pads may be placed between the inner surface of the top wall 115 and the top of the magnet to mute or muffle sounds created by the magnet impacting the shell. These pads are likewise not shown. Other elements on the linear vibrator 100 may also be omitted from FIG. 1 for purposes of clarity, although one of skill in the art will appreciate that such elements may be present in operation or construction.

Generally, the linear vibrator 100 includes a shell 110, a coil 120 disposed within the shell and adjacent the interior of the shell's sidewall(s), a mass (e.g., magnet) 105 within the coil and a tap rod 125 projecting upwardly from the magnet. "Up," "down," "top," "bottom" and other such directions and/or references are used for purposes of convenience and with respect to the orientation shown in the figures, although it should be appreciated that certain embodiments may vary such directions, references and relationships described by directions and/or references, as necessary. For example, in some embodiments the tap rod 125 may project downwardly from the magnet 105 when the linear vibrator 100 is in the orientation shown in FIG. 1.

It should also be appreciated that the mass 105 need not be magnetic in and of itself. Instead, the mass 105 may be made of steel, iron or another material that reacts to magnetic fields, such that the mass may move when the coil 120 is energized. Similarly, it should be appreciated that the single coil 120 shown in the figures may be replaced with multiple coils in order to create a multi-phase actuator.

The tap rod 125 extends through an opening 130 in the top of the shell and is affixed to the magnet 105. The tap rod may be made from any suitable material, including metal, ceramic, a magnetic material, composites, plastics and the like. As the magnet 105 moves, the tap rod 125 moves.

Figure 2:
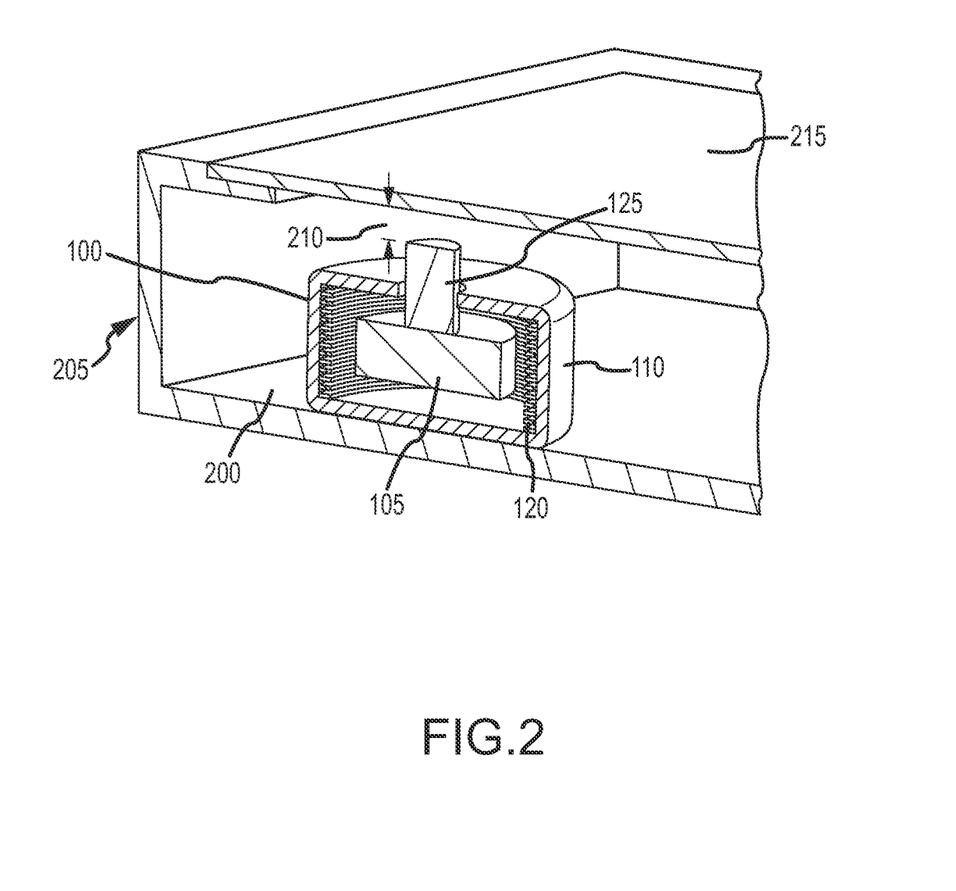
FIG. 2 is a cut-away view perspective of the linear vibrator of FIG. 1 in a sample electronic device enclosure.

FIG. 2 is a cut-away view showing the linear vibrator 100 affixed to a wall 200 of the electronic device enclosure 205. The enclosure 205 may be the body of a mobile phone, for example, or the body of a tablet computing device, personal digital assistant, laptop computer, computing peripheral or other suitable device. Typically, although not necessarily, the linear vibrator's shell is affixed to a rear wall 200 of the enclosure. In the present embodiment, neither the shell 110 nor the tap rod 125 of the vibrator abuts the enclosure 205 when the vibrator is inactive. An air gap 210 exists between the top of the tap rod and the inner surface of the upper wall 215 of the device enclosure.

It should be appreciated that the size, configuration and/or positioning of the shell 110 and/or tap rod 125 may vary from embodiment to embodiment. Accordingly, the setup shown in FIG. 2 is meant merely to be illustrative of one sample embodiment.

Figure 3A:
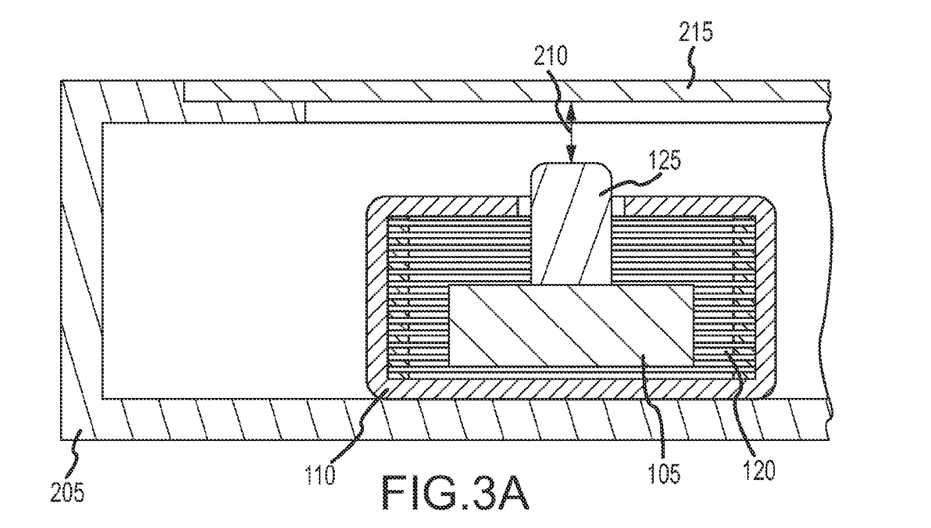
FIG. 3A is a cross-sectional view of the linear vibrator of FIG. 1 in a first operational position within the enclosure of FIG. 2.
Figure 3B:
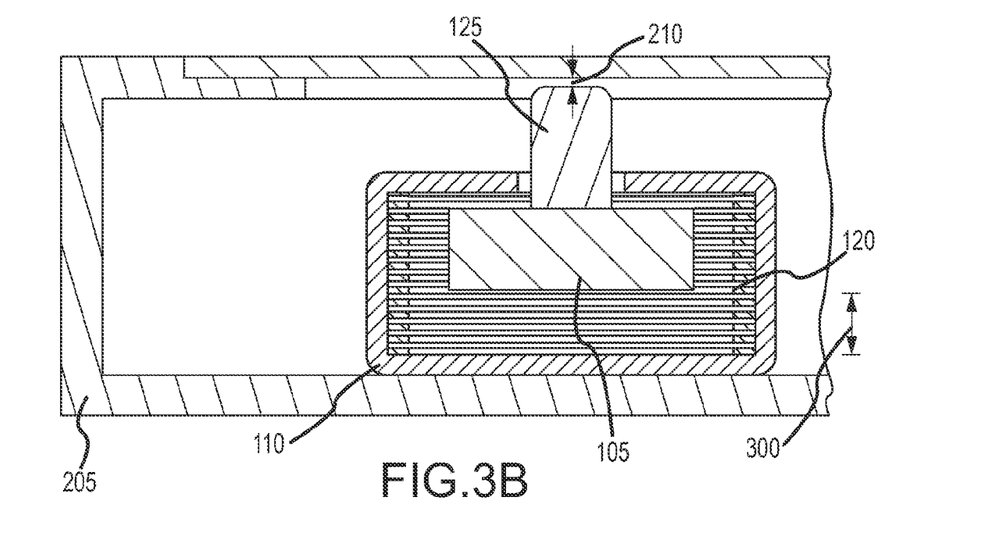
FIG. 3B is a cross-sectional view of the linear vibrator of FIG. 1 in a second operational position within the enclosure of FIG. 2.

FIGS. 3A and 3B depict the linear vibrator 100 during normal operation (e.g., when generalized haptic feedback is required or requested). During normal operation, current is provided to the coil 120. When the coil is energized, it generates a magnetic field that displaces or deflects the magnet 105. Generally, the magnet 105 is deflected upward. When the coil 120 is de-energized, the magnet may return to its initial position. Thus, if the current is a direct current, the coil may be sequentially energized and de-energized to rapidly oscillate the magnet between the positions shown in FIGS. 3A and 3B. It should be appreciated that the deflection shown in FIG. 3B results from energizing the coil 120. When the coil is energized, the size of the air gap 210 between the tap rod and top surface of the enclosure shrinks, but typically the air gap is still present. The motion of the magnet 105 or mass may create a vibration or motion in the enclosure or associated electronic device, thereby generating a haptic feedback for a user.

Other embodiments may provide an alternating current to energize the coil 120. In these embodiments, the magnet 105 may be forced upward during one phase of the alternating current and downward during the other. Accordingly, it may not be necessary to sequentially energize and de-energize the coil as with a direct current.

Figure 4:
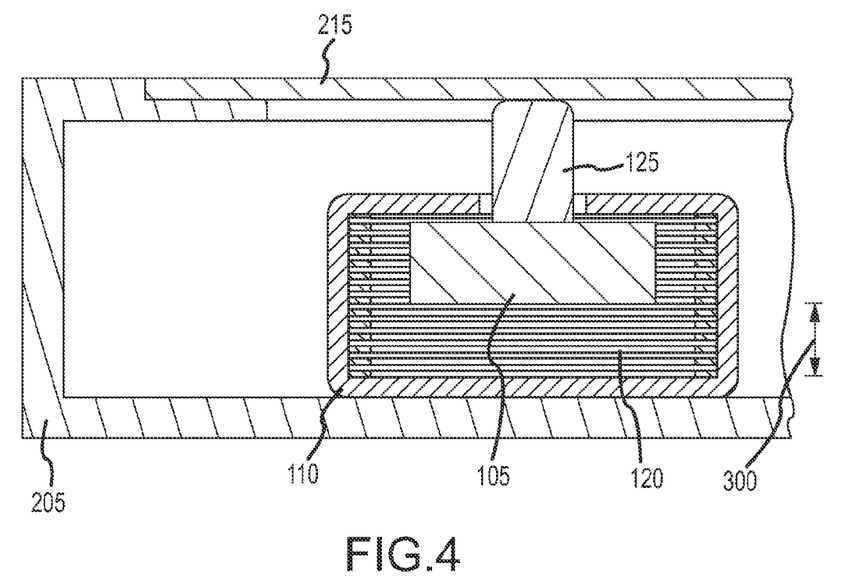
FIG. 4 is a cross-sectional view of the linear vibrator of FIG. 1 in a third operational position within the enclosure of FIG. 2, providing localized haptic feedback.

FIG. 4 depicts the linear vibrator 100 during a boosted operation, at maximum deflection. When enhanced localized haptic feedback is desired, the current provided to the linear vibrator 100 may be increased, thereby increasing the maximum deflection of the magnet 105 within the coil 120. This, in turn, increases deflection of the tap rod 125. In the present embodiment, the tap rod 125 is deflected sufficiently to impact the electronic device housing, thereby creating a localized feedback that may be physically perceived (for example, by a user's finger or hand). The aforementioned oscillation of the magnet 105 draws the tap rod 125 down, away from the enclosure, and then pushes the rod into the enclosure. The frequency of oscillation may be varied to create different haptic responses.

Certain embodiments may actuate the linear vibrator 100 in response to different input signals. Further, the vibrator 100 may be actuated in normal or boosted mode in response to different input signals. As one non-limiting example, the vibrator may be incorporated into a mobile telephone having a touch-sensitive input. When a telephone call is received and the phone is set to a silent or vibrate mode, the linear vibrator 100 may operate in the normal mode. Thus, the received call functions as an input signal to activate the vibrator. The normal mode may not only provide haptic feedback, but an audible feedback such a s a "buzz" or vibrating noise, as well.

Further, the vibrator 100 may be configured to be activated when a user touches a particular portion of a touch-sensitive screen of the mobile phone. When the user's touch or near-touch is sensed in the appropriate area of the screen, the vibrator may be activated in a boosted mode, thereby providing localized haptic feedback directly under the area in which the touch was sensed. In this manner, the localized haptic feedback may serve to confirm the touch to the user, for example by emulating the feeling of pressing a button. In this embodiment, the linear vibrator 100 is located under the particular portion of the touch screen in which localized haptic feedback is desired. The touch screen may be capacitive sensing, resistive sensing, or the like. In some embodiments, the button may not be depressed by a user input. Instead, the localized haptic feedback may vibrate or move the button (or button area) in such a manner that it emulates the feeling of pressing a button, for example through vibration or motion of the button area.

This may be useful, for example, in a touch-sensitive mobile phone having a button or other input that is not physically depressed but instead operates when a touch is sensed. That is, instead of mechanical actuation, the button may initiate an input command when the phone senses a user is touching the button. ("Button," in this case, refers to a particular portion of the touch screen as opposed to a separate, mechanically actuated input) By providing localized haptic feedback at the physical location of the button when it is touched, a user may know his touch was sensed and the input initiated/accepted. Thus, the linear vibrator 100 may be located beneath the button. In another embodiment, touching the button may toggle the vibrator between the boosted and normal modes. In such an embodiment, the haptic feedback may occur after the user input as toggled the operational mode and after the user input has ceased. Accordingly, the user input need not be present in order for a particular operational mode to be active; rather, the user input can impact the mode of haptic feedback even after the input has ceased.

Figure 5:
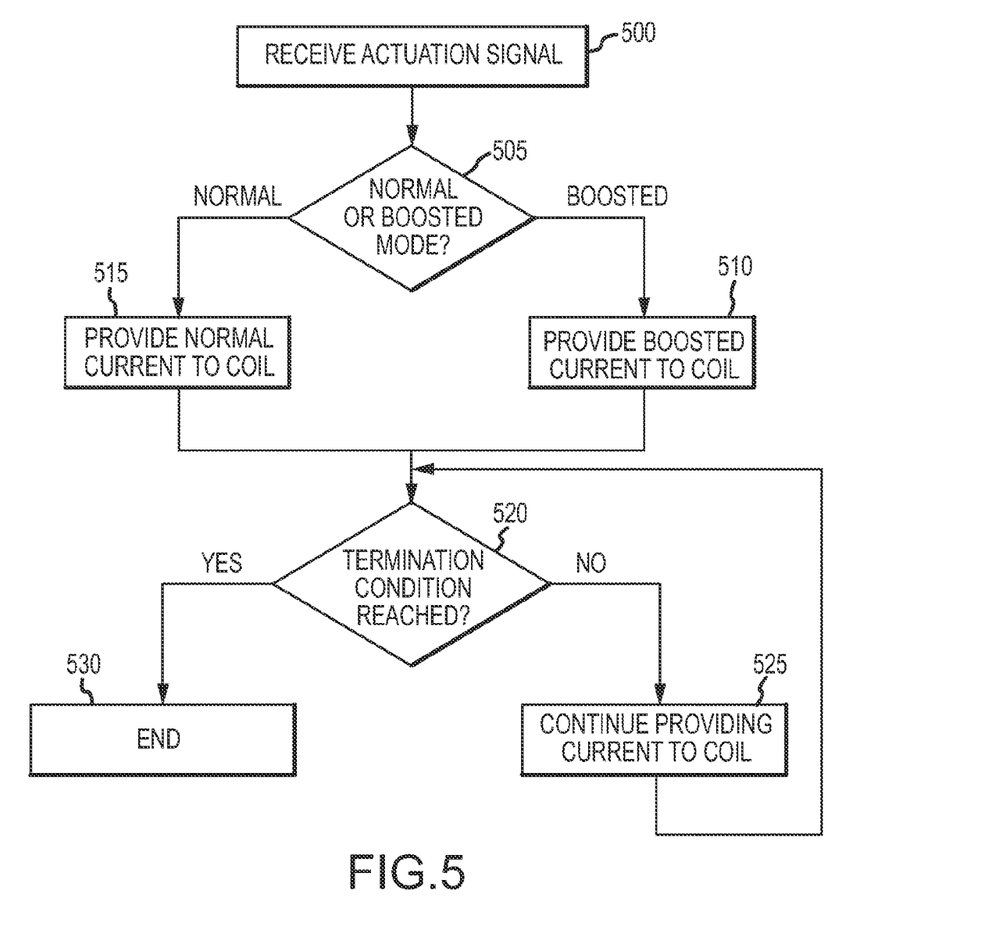
FIG. 5 is a flowchart depicting operational modes of the linear vibrator of FIG. 1.

FIG. 5 is a general flowchart showing one sample method for operating the linear vibrator described herein. The method begins in operation 500, in which an actuation signal is received by the embodiment. In operation 505, it is determined whether the vibrator 100 is to be driven in normal or boosted mode.

If normal mode is desired, operation 515 is executed and normal current is delivered to the linear vibrator 100. This provides a generalized haptic output; the linear vibrator is driven so that the tap rod 125 does not impact the enclosure. Generally, the range of motion of the magnet 105 and tap rod 125 may be similar to that shown in FIGS. 3A and 3B. Following operation 515, operation 520 is executed.

By contrast, if a boosted mode is desired then operation 510 is executed. In operation 510, sufficient current is provided to the linear actuator that it operates in the boosted mode described with respect to FIG. 4. That is, a higher level of current is supplied to the coil than in the normal mode of operation, and the magnet 105 is deflected sufficiently that the tap rod impacts the enclosure. As the magnet oscillates, the tap rod 125 repeatedly strikes the enclosure to provide localized haptic feedback. Following operation 510, operation 520 is accessed.

In operation 520, the embodiment determines if a termination condition is reached. The termination condition may vary and may depend on the mode in which the linear vibrator 100 is operating. For example, answering an incoming call may serve as a termination condition for the linear vibrator being driven in its normal mode. Similarly, the cessation of a capacitive input on a particular portion of a touch screen may serve as a termination condition when the linear vibrator is being driven in a boosted mode.

If no termination condition is reached, then the embodiment continues providing current to operate the linear vibrator in operation 525. Periodically, the embodiment returns to operation 520 to again check for a termination condition.

If a termination condition is detected, then current to the vibrator is stopped and end state 530 is entered.

It should be appreciated that either current or voltage may drive the linear vibrator. Accordingly, references to current herein should be understood to encompass voltage, as necessary or appropriate.

Although embodiments have been described with respect to particular physical configurations and methods of operation, one of ordinary skill in the art will appreciate that alternatives exist. Such alternatives are contemplated and considered to be within the scope of protection.

What is claimed is:

1. A haptic feedback device for providing haptic feedback, comprising:
   a housing;
   a touch-sensitive display disposed at least partially within the housing;
   a driver disposed within the housing; and
   a movable mass within the driver;
   wherein the driver is configured to:
      cause the movable mass to oscillate to a maximum distance not greater than a first distance in order to produce a generalized haptic feedback to the housing; and
      cause at least a portion of the mass to displace a second distance greater than the first distance to produce a localized haptic feedback to the touch-sensitive display.

2. The haptic feedback device of claim 1, wherein:
   the driver comprises at least one coil; and
   the movable mass is a magnetic material.

3. The haptic feedback device of claim 2, wherein:
   the at least one coil is configured to receive a first and second level of current;
   the movable mass is displaced a first distance when the at least one coil receives the first level of current; and
   the movable mass is displaced a second distance when the at least one coil receives the second level of current.

4. The haptic feedback device of claim 3, wherein movable mass comprises a projection that extends beyond the driver and toward the touch-sensitive display.

5. The haptic feedback device of claim 3, wherein the at least one coil is configured to receive the second level of current when the touch-sensitive display is touched.

6. A method for providing haptic feedback with a linear vibrator within an electronic device, the method comprising:
   receiving an input signal;
   determining if the input signal corresponds to a generalized haptic feedback; if so, providing a first input to the linear vibrator corresponding an oscillation of the linear vibrator that does not exceed a first distance to produce a first haptic output to a housing of the electronic device; and
   determining if the input signal corresponds to a localized haptic feedback; if so, providing a second input to a linear vibrator corresponding to a displacement of at least a portion of the linear vibrator beyond a second distance to produce a second haptic output to a portion of the housing of the electronic device; wherein
   the second distance is greater than the first distance.

7. The method of claim 6, wherein:
   the first input is a first current; and
   the second input is a second current.

8. The method of claim 6, wherein the operation of determining if the input signal corresponds to a generalized haptic feedback comprises:
   sensing a user input; and
   in response to sensing the user input, determining that the input signal does not correspond to a localized haptic feedback.

9. The method of claim 8, wherein the operation of determining that the input signal does not correspond to a localized haptic feedback occurs after the user input has ceased.

10. The method of claim 8, wherein:
    the operation of sensing a user input comprises sensing a user touching a button shown on a display screen of the electronic device; and
    the localized haptic feedback is output to the button.

* * * * *